United States Patent [19]

Lyle

[11] Patent Number: 4,809,545
[45] Date of Patent: Mar. 7, 1989

[54] GRAVIMETRY LOGGING

[75] Inventor: W. D. Lyle, Grapevine, Tex.

[73] Assignee: Mobil Oil Corporation, New York, N.Y.

[21] Appl. No.: 72,477

[22] Filed: Jul. 13, 1987

Related U.S. Application Data

[63] Continuation-in-part of Ser. No. 868,853, May 30, 1986, abandoned.

[51] Int. Cl.$^4$ .......................................... E21B 47/00
[52] U.S. Cl. ..................................... 73/151; 73/382 R
[58] Field of Search ................. 73/382 G, 382 R, 152, 73/151; 177/210 FP

[56] References Cited

U.S. PATENT DOCUMENTS

| | | | |
|---|---|---|---|
| 2,268,495 | 12/1941 | Petty | 73/382 R |
| 2,618,156 | 11/1952 | Boucher | 73/152 X |
| 3,336,806 | 8/1967 | Kalmus | 73/382 R |
| 3,470,400 | 9/1969 | Weisbord | 310/15 |
| 3,472,076 | 10/1969 | Howell et al. | 73/382 R |
| 3,479,536 | 11/1969 | Norris | 310/323 |
| 3,566,692 | 3/1971 | Bock et al. | 73/382 R |
| 3,592,062 | 7/1971 | Mathey | 73/382 R |
| 3,600,951 | 8/1971 | Easton | 73/382 R |
| 4,399,693 | 8/1983 | Gournay | 73/152 |
| 4,419,891 | 12/1983 | Browning | 73/382 G |
| 4,475,386 | 10/1984 | Fitch et al. | 73/151 |
| 4,517,841 | 5/1985 | Peters et al. | 73/517 AV |
| 4,596,139 | 6/1986 | Gournay | 73/151 |
| 4,599,896 | 7/1986 | Stewart | 73/382 R |
| 4,602,508 | 7/1986 | Fitch et al. | 73/382 G |
| 4,625,547 | 12/1986 | Lyle, Jr. | 73/152 |

FOREIGN PATENT DOCUMENTS

| | | | |
|---|---|---|---|
| 0610724 | 12/1960 | Canada | 73/382 G |
| 0201681 | 4/1960 | U.S.S.R. | 73/382 G |
| 0532069 | 10/1976 | U.S.S.R. | 73/382 R |
| 0586411 | 1/1979 | U.S.S.R. | 73/382 R |
| 0693324 | 10/1979 | U.S.S.R. | 73/382 R |

OTHER PUBLICATIONS

"Precision Digital Pressure Transducer", Jerome M. Paros, ISA Transactions, vol. 12, No. 2, 1973, pp. 173–179.

"Digital Pressure Transducers", Jerome M. Paros, Measurements & Data, Issue 56, vol. 10, No. 2, Mar.-Apr. 1976.

"Differential Frequency Gravimeter, Inst. and Exp. Tech.", A. G. Smagin et al., vol. 22, No. 6, Nov.-Dec. 1979.

Primary Examiner—Eugene R. LaRoche
Assistant Examiner—Serry Ham
Attorney, Agent, or Firm—Alexander J. McKillop; Charles J. Speciale; George W. Hager, Jr.

[57] ABSTRACT

A gravity gradient logging tool is used to conduct a gravimetry survey of an earth formation. A pair of piezoelectric transducers are located at spaced apart positions within the logging tool. Each transducer is loaded with a known mass and excited electrically so as to vibrate at a characteristic resonant frequency. The period of vibration of each transducer is measured as the logging tool continuously traverses the formation. The difference in the measured periods of vibration is determined as a measure of gravity gradient along the formation.

4 Claims, 2 Drawing Sheets

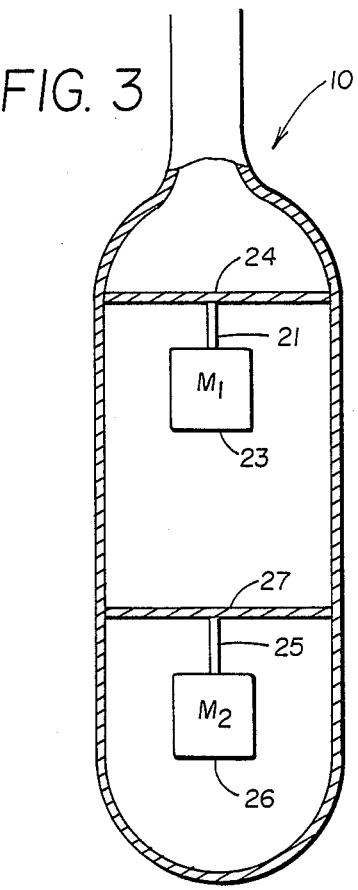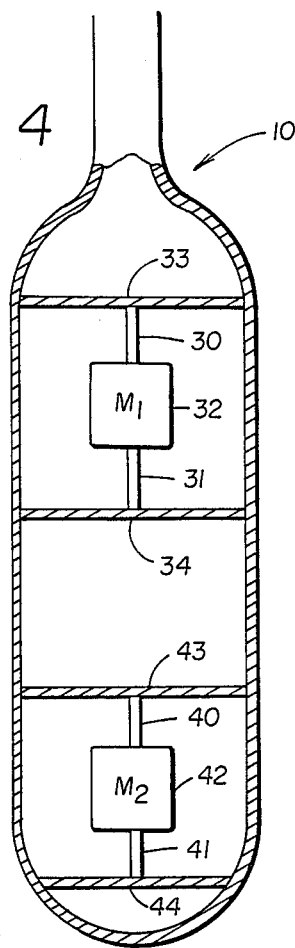

GRAVIMETRY LOGGING

CROSS-REFERENCE TO RELATED APPLICATIONS

This application is a Continuation-in-Part of copending application, Ser. No. 868,853, abandoned filed May 30, 1986.

BACKGROUND OF THE INVENTION

The present invention relates to a method and system for the continuous logging of the gravity gradient along an earth formation. In applications of formation gravity measurements, it is only the gravity gradient that is of interest since the gradient is related to the bulk density of the formation between the measurement stations according to well-known formulas. From this bulk density, estimates can be obtained of porosity and fluid saturation in the porous rocks of the formation. This gravity gradient has been determined by measuring the gravity difference of any two points along the formation and then dividing by the vertical distance separating the two points.

Current gravity technology measures gravity at discrete points along a formation by detecting motion of a small test mass in a gravity logging tool as the tool remains stationary. Small changes in gravitational acceleration cause this mass to move against the restoring force of a spring. Various approaches to the detection of this minute movement are possible. One such method is illustrated in detail in U.S. Pat. No. 4,399,693, to L.S. Gournay. The general arrangement of a gravimetric exploration operation as well as a conventional La-Coste- and Romberg-type gravity meter of the mass-spring combination is shown in such Gournay patent. Also in the Gournay patent is the standard formula for computing formation bulk density from the gravity difference measurements. These gravity difference measurements must be made when the tool is motionless with respect to the formation. Such tool is not practical for making continuous measurements since there is no accurate means for eliminating the force on the test mass due to tool acceleration, and consequently, accurate gravity readings cannot be made with the tool in motion. This limitation requires that the gravity tool be stopped for a period of several minutes at each point or station along the formation at which a gravity difference measurement is desired. Another limitation is that the resolution of the tool is only about ten feet.

It is, therefore, an object of the present invention to provide a method and system for the continuous gravity logging which directly measures the variation of gravity gradient along a formation rather than gravity difference and which is insensitive to the effects of accelerations due to unsteady motions of the gravity logging tool.

In U.S. Pat. No. 4,602,508 of J.L. Fitch and W.D. Lyle, Jr., filed Oct. 4, 1984, there is described a method and system for conducting a continuous gravimetry survey of earth formations. The formation is continuously traversed with a gravity logging tool having a column of fluid within the tool. A first pressure difference is measured along a first interval within the column of fluid. A second pressure difference is measured along a second interval within the column of fluid. These first and second pressure difference measurements are differenced to determine the gravity gradient between such first and second intervals. The first interval over which the first pressure difference is measured lies within a first portion of the logging tool and the second interval over which the second pressure difference is measured lies within a second portion of the logging tool. In an alternate embodiment, the first and second intervals overlap at least along a portion of the fluid column. The logging tool includes a container for the fluid column which maintains a constant pressure along the length of the column. Temperature is maintained constant along the column by an external heat absorber or by a heat absorbing element located with the column itself. Baffles are located within the fluid column to prevent thermally driven convection. A sound absorber is also located within the fluid column to inhibit the transmission of acoustic waves. The fluid column is further shock-mounted to prevent acoustic waves from being excited within the column itself.

SUMMARY OF THE INVENTION

In accordance with the present invention, the surface of an earth formation or a borehole through a subsurface formation is continuously traversed with a gravity logging tool having at least two piezoelectric force transducers which are excited to vibrate at a characteristic resonant frequency. This period of vibration changes in response to the force exerted on the transducer by the acceleration of gravity and acceleration due to tool motion along the formation. Measurements are made of the vibration periods as the tool traverses the formation. These measurements are differenced as a measure of the gravity gradient along the formation.

More particularly, first and second piezoelectric transducers are located at spaced-apart axial positions within the logging tool. Each transducer is loaded with an affixed mass. The difference in the periods of vibration of such first and second transducers are differenced as a continuous measure of the gravity gradient along an earth formation. The loading of each transducer is carried out by vertically orienting the transducer and affixing one end to a horizontal support member within the logging tool and the other end to the loading mass. In one aspect, the transducers may be affixed at their lower ends to the horizontal support member and be loaded with the mass at their upper ends. In a further aspect, the transducers may be affixed at their upper ends to the horizontal support member and be loaded with the mass at their lower ends. In a still further aspect, each piezoelectric transducer may comprise a pair of vertically oriented piezoelectric crystals. One of such pair of crystals is affixed at its upper end to the horizontal support member while the other crystal is affixed at its lower end to the horizontal support member. The loading mass is then mounted between the remaining ends of such pair of crystals. In this manner, one of such pair of crystals will be in a state of compression, while the other of such pair of crystals will be simultaneously in a state of tension.

BRIEF DESCRIPTION OF THE DRAWINGS

FIGS. 2-4 illustrate alternate embodiments of the piezoelectric transducers utilized in the gravity logging system of FIG. 1 for making the gravity gradient measurements.

DESCRIPTION OF THE PREFERRED EMBODIMENT

In accordance with the present invention, there is provided a method and system for gravity gradient logging in which the gravity gradient is measured directly by differencing the outputs of spaced apart sensors which respond to total acceleration. The sensors are separated by a fixed and known distance. Each sensor responds to acceleration due to both the gravitational field and tool movement. The sensors experience the same tool acceleration provided their responses are equal when the vertical distance between them is zero and there is no relative motion between them when the gravity measurements are made. Therefore, the difference in sensor outputs will cancel the effects of tool acceleration and yield an output dependent only on the gravity gradient for the vertical separation between the sensors.

Figure 1:
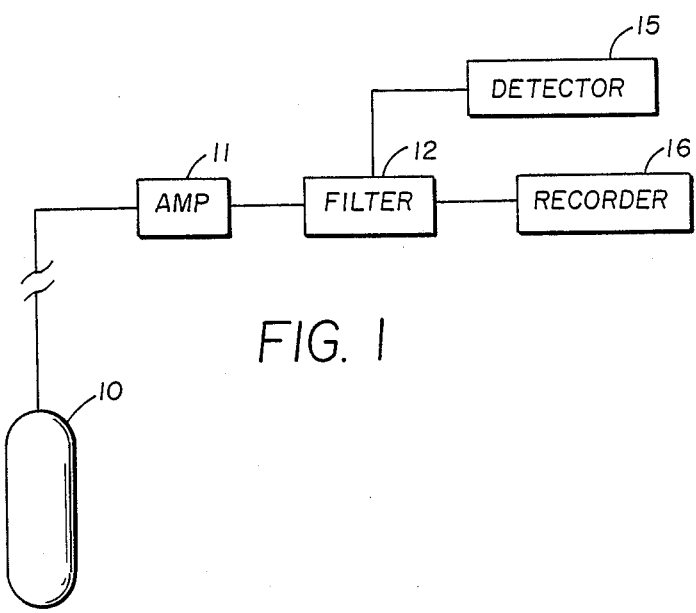
FIG. 1 illustrates a gravity logging system with which the gravity gradient measurement of the present invention may be utilized.

Referring now to FIG. 1, gravity gradient measurements are made by continuously moving the tool 10 along the surface of an earth formation or along a borehole through a subsurface formation. The gravimetric measurements are applied to an amplifier 11, a filter 12, difference detector 15, and a recorder 16 to produce a log of gravity gradient measurements as a function of tool location. The gravity measurements are coordinated with the depth of the tool in the borehole.

The gravity gradient measurements of logging tool 10 are accomplished by the measurement of changes in the force exerted on one or more piezoelectric transducers contained within the logging tool from acceleration due to gravity and tool motion as the tool traverses the formation of interest. The basic principle involved is that a piezoelectric crystal, when electrically excited, exhibits a characteristic natural frequency of vibration that changes according to the force (i.e., compression or tension) applied to the crystal. The expression which relates the period of such vibration to such force is as follows:

$$F = \sum_{k=0}^{N} A_k (T_0/T)^k, \qquad (1)$$

where,

F = force applied to the piezoelectric transducer,
$A_k$ = experimentally determined modeling coefficients dependent on temperature that relate force F to vibration periods T and $T_0$,
$T_o$ = vibration period for zero force applied to the transducer, determined experimentally and based on temperature, and
T = vibration period for the force applied to the transducer due to the acceleration of gravity as the transducer is continuously moved through a borehole.

The force F is expressed as:

$$F = Mg, \qquad (2)$$

where M = known mass used to load the piezoelectric crystal, and
g = acceleration due to gravity.
A change in this force caused by a change in the acceleration due to gravity is expressed as: and can be measured by detecting the change $\Delta T$ in the period of vibration of the piezoelectric crystal.

Figure 2:
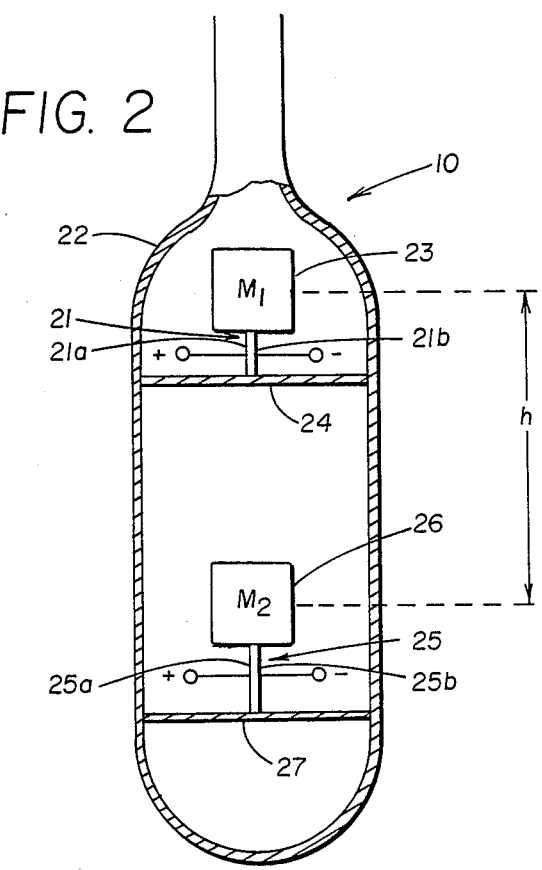

FIG. 2 illustrates one embodiment of a gravity logging tool for detecting such $\Delta T$ changes in the period of vibration of a piezoelectric crystal so that a gravity gradient $\Delta g$ can be determined. A first piezoelectric crystal ($T_1$) 21 is vertically oriented with its lower end affixed to horizontal support member 24 of the logging tool 10. Affixed to and supported by the upper end of the piezoelectric crystal 21 is the mass ($M_1$) 23 utilized for loading the crystal 21. The crystal is excited into resonance at a characteristic frequency of vibration by the application of opposite polarity electrical pulses to its opposite surfaces 21a and 21b. As the logging tool traverses the formation of interest, the force applied to the piezoelectric crystal is as follows:

$$F_1 = M_1 g_1 - M_1 a = \sum_{k=0}^{N} A_k (T_{01}/T_1)^k \qquad (4)$$

where, a = acceleration to the logging tool.

In similar manner, a second piezoelectric crystal ($T_2$) 25 is vertically oriented with its lower end affixed to horizontal support member 27 of the logging tool 10. Affixed to and supported by the upper end of the piezoelectric crystal 25 is the mass ($M_2$) 26 for loading the crystal 25. The crystal is excited into resonance at a characteristic frequency of vibration by the application of opposite polarity electrical pulses to its opposite surfaces 25a and 25b. As the logging tool is moved along the formation, the force applied to the piezoelectric crystal is as follows:

$$F_2 = M_2 g_2 - M_2 a = \sum_{k=0}^{N} B_k (T_{02}/T_2)^k. \qquad (5)$$

Inspection of equations (4) and (5) reveals that if the masses $M_1$ and $M_2$ are made equal in magnitude to a common value M, then differencing the equations will result in acceleration cancelling.

Differencing equations (4) and (5) with masses $M_1$ and $M_2$ each equal to a common value M determines the change in force along the formation between the two piezoelectric crystals 21 and 25 and yields:

$$\Delta F = M(g_1 - g_2) = M\Delta g, \text{ and} \qquad (6)$$

$$\Delta F = \sum_{k=0}^{N} [B_k(T_{02}/T_2)^k - A_k(T_{01}/T_1)^k, \qquad (7)$$

from which the gravity gradient $g_2 - g_1$ is determined:

$$\Delta g/h = (g_2 - g_1)/h, \qquad (8)$$

where h = the distance separating the two piezoelectric crystals 21 and 25. This gradient is determined by the difference detector 15 of FIG. 1 from the differences in the measured periods of vibrations $T_2$ and $T_1$ of the piezoelectric crystals 25 and 21, respectively.

Alternate embodiments of FIG. 2 may be used in carrying out the gravity gradient measurement method of the present invention. As illustrated in FIG. 3, the piezoelectric crystals 21 and 25 may be vertically oriented with their upper ends affixed to horizontal support members 24 and 27, respectively, of logging tool 10. The masses ($M_1$) 23 and ($M_2$) 26 are affixed to and suspended from the lower ends of piezoelectric crystals 21 and 25, respectively.

In the further alternate embodiment of FIG. 4, the piezoelectric crystal 21 has been replaced by a pair of crystals 30 and 31, while the piezoelectric crystal 25 has been replaced by a pair of crystals 40 and 41. Piezoelectric crystal 30 is affixed at its upper end to horizontal support member 33, while piezoelectric crystal 31 is affixed at its lower end to horizontal support 34. Mass ($M_1$) 32 is affixed to and suspended from the lower end of crystal 30 and is also affixed to and supported by the upper end of crystal 31. In similar manner, the mass ($M_2$) 42 is affixed between piezoelectric crystals 40 and 41 which are, in turn, affixed to horizontal support members 43 and 44, respectively. In this configuration, the crystals 30 and 40 will be in states of compression when crystals 31 and 41 are in states of tension. Conversely, crystals 30 and 40 will be in states of tension when crystals 31 and 41 are in states of compression. There are two advantages in using the paired crystal configuration. First, each crystal in the pair produces an output period that may be used to compute a force, and this pair of forces can then be averaged to yield a more accurate measurement. Second, the push-pull configuration provides a damping of the mass movement that may result in sudden changes in acceleration due to tool movement. In the single crystal arrangement a sudden change in acceleration could lead to damage of the crystal whereas in the paired configuration the mass in constrained by the upper and lower crystals thereby providing protection of the crystals.

Apparatus for carrying out the method of the present invention may employ piezoelectric transducers of the type shown in U.S. Pat. Nos. 3,470,400 and 3,479,536. Techniques for electrically exciting and measuring the period of vibration of the crystals used in such transducers are fully disclosed in such patents. The piezoelectric transducers may preferably be of the quartz crystal type used by ParaScientific Company for use in pressor sensors. These transducers may be coupled with a Hewlett-Packard HP-5370B time interval counter for providing a desired frequency resolution. Interval counter may be coupled to a Hewlett-Packard HP 85 or similar minicomputer for determining differences in the periods of vibration between the piezoelectric transducer locations. Preferably, the distance h between the piezoelectric transducer locations is about five feet.

It may be desirable to maintain a relatively constant temperature within the logging tool housing 22; however, corrections for the effects of small changes in temperature are easily made, if necessary. Temperature can be maintained reasonably constant by heating the column to a temperature greater than the expected maximum environmental temperature. Even better temperature control can be achieved by thermally insulating the column. This may be achieved by mounting it inside a vacuum flask. Still further, temperature control can be achieved by including a heat absorber within the housing. A very effective heat absorbing material is solid gallium which melts at about 87° F.

While preferred embodiments of the invention have been described and illustrated, numerous modifications or alterations may be made without departing from the spirit and scope of the invention as set forth in the appended claims.

I claim:

1. A method for conducting a gravimetry survey of an earth formation, comprising the steps of:
   (a) continuously traversing said formation with a gravity logging tool having at least two piezoelectric force transducers mounted at spaced-apart positions within said tool,
   (b) exciting said piezoelectric transducers to vibrate at a characteristic resonant frequency,
   (c) measuring the periods of vibration of said piezoelectric transducers as said logging tool continuously traverses said formation, said periods of vibration changing in response to the force exerted on said piezoelectric transducer by the acceleration of gravity and acceleration due to tool motion along said formation, and
   (d) determining the difference in the measured periods of vibration of said piezoelectric transducers compensated for temperature relating force to said periods of vibration within said formation in accordance with the following expression as said logging tool continuously traverses said formation as a measure of the gravity gradient along said formation:

$$(g_2 - g_1)M = \sum_{k=0}^{N} [B_k(T_{02}/T_2)^k - A_k(T_{02}/T_1)^k]$$

where:
$g_1$ = gravity at a first of said two piezoelectric force transducers,
$g_2$ = gravity at a second of said two piezoelectric force transducers,
M = mass affixed to each of said transducers for applying the force to cause said transducers to vibrate in response to the acceleration of gravity as said transducers are continuously moved along the formation,
$T_{01}, T_{02}$ = vibration period for zero force applied to said first and second transducers, respectively,
$T_1, T_2$ = vibration period for the force applied to said first and second transducers respectively, due to the acceleration of gravity as said transducers are continuously moved along the formation, and
$A_k$
and
$B_k$ = transducer coefficients based on measured temperature and determined experimentally for each of said transducers.

2. Apparatus for conducting a gravimetry survey of an earth formation, comprising:
   (a) a gravity logging tool,
   (b) first and second piezoelectric transducer located at spaced-apart axial positions within said logging tool,
   (c) first and second masses affixed to said first and second piezoelectric transducers, respectively, for loading said transducers,
   (d) means for electrically exciting each of said first and second piezoelectric transducers to vibrate at a characteristic resonant frequency,
   (e) means for measuring the periods of vibration of each of said first and second piezoelectric transducers as the logging tool continuously traverses said earth formation, said periods of vibration of said first and second transducers changing in response to the force exerted on said transducers by the effects of the acceleration of gravity and acceleration due to tool motion on said first and second masses as said logging tool continuously traverses said formation, (f) means for determining the difference in said measured periods of vibration of said first and second piezoelectric transducers as a continuous measure of the gravity gradient within said formation compensated for temperature relating force to said periods of vibration within said formation in accordance with the following expression:

$$F = \sum_{k=0}^{N} A_k(T_0/T)^k,$$

where,

F = force applied to the piezoelectric transducer, $A_k$ = experimentally determined modeling coefficients dependent on temperature that relate force F to vibration periods T and $T_0$, $T_o$ = vibration period for zero force applied to the transducer, determined experimentally and based on temperature, and T = vibration period for the force applied to the transducer due to the acceleration of gravity as the transducer is continuously moved through a borehole.

3. The apparatus of claim 2 wherein:
(a) said first piezoelectric transducer comprises a first piezoelectric crystal that is affixed at one end to said logging tool and is affixed at its opposite end to said first mass, said first mass being thereby isolated from contact with said logging tool by said first piezoelectric crystal, and
(b) said second piezoelectric transducer comprises a second piezoelectric crystal that is affixed at one end to said logging tool and is affixed at its opposite end to said second mass, said second mass being thereby isolated from contact with said logging tool by said second piezoelectric crystal.

4. The apparatus of claim 3, wherein:
(a) said first piezoelectric transducer comprises first and second piezoelectric crystals positioned at spaced-apart positions along the axis of said logging tool and affixed at their opposite ends to said logging tool,
(b) said first mass is affixed between the adjacent ends of said first and second piezoelectric crystals, whereby one of said first and second piezoelectric crystals is in a state of compression, while the other of said first and second piezoelectric crystals is simultaneously in a state of tension,
(c) said second piezoelectric transducer comprises third and fourth piezoelectric crystals positioned at spaced-apart positions along the axis of said logging tool and affixed at their opposite ends to said logging tool,
(d) said second mass is affixed between the adjacent ends of said third and fourth piezoelectric crystals, whereby one of said third and fourth piezoelectric crystals is in a state of compression, while the other of said third and fourth piezoelectric crystals is simultaneously in a state of tension.

* * * * *

UNITED STATES PATENT AND TRADEMARK OFFICE
CERTIFICATE OF CORRECTION

PATENT NO. : 4,809,545
DATED : March 7, 1989
INVENTOR(S) : W. D. Lyle

It is certified that error appears in the above-identified patent and that said Letters Patent is hereby corrected as shown below:

Col. 3, line 64, insert -- $\Delta F = M\Delta g$, -- after "expressed as:"

Col. 6, line 22, delete "...$-A_k(T_{02}/T_1)^k$]" and insert -- $-A_k(T_{01}/T_1)^k$] --

Col. 6, line 38, insert --,-- before respectively.

Col. 6, line 50, delete "transducer" and insert --transducers--.

Signed and Sealed this
Sixth Day of February, 1990

*Attest:*

JEFFREY M. SAMUELS

*Attesting Officer*   *Acting Commissioner of Patents and Trademarks*